United States Patent
Diamant et al.

(10) Patent No.: US 10,366,026 B1
(45) Date of Patent: Jul. 30, 2019

(54) RANDOM ACCESS TO DECOMPRESSED BLOCKS

(71) Applicant: AMAZON TECHNOLOGIES, INC., Seattle, WA (US)

(72) Inventors: Ron Diamant, Albany, CA (US); Andrea Olgiati, Gilroy, CA (US); Nathan Binkert, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 15/390,250

(22) Filed: Dec. 23, 2016

(51) Int. Cl.
*G06F 13/28* (2006.01)
*G06F 9/46* (2006.01)

(52) U.S. Cl.
CPC .............. *G06F 13/28* (2013.01); *G06F 9/467* (2013.01)

(58) Field of Classification Search
CPC ....................................................... G06F 13/28
See application file for complete search history.

(56) References Cited

U.S. PATENT DOCUMENTS

| 5,892,465 | A * | 4/1999 | Kitabatake | H04N 5/21 341/50 |
| 6,671,408 | B1 * | 12/2003 | Kaku | H04N 5/772 382/232 |
| 9,025,892 | B1 * | 5/2015 | Lightner | H03M 7/30 382/232 |
| 2010/0268815 | A1 * | 10/2010 | Alonso Alarcon | G06F 17/30359 709/224 |
| 2017/0115924 | A1 * | 4/2017 | Abali | G06F 13/362 |

* cited by examiner

Primary Examiner — Farley Abad
(74) Attorney, Agent, or Firm — Blank Rome LLP (57) ABSTRACT

A system comprises a data storage, a decompression accelerator configured to decompress compressed data and thereby generate decompressed data, and a direct memory access (DMA) engine coupled to the data storage and the decompression accelerator. The DMA engine comprises a buffer for storage of a plurality of descriptors containing configuration parameters for a block of compressed data to be retrieved from the data storage and decompressed by the decompression accelerator, wherein at least one of the descriptors comprises a threshold value. The DMA engine, in accordance with one or more of the descriptors, is configured to read compressed data from data storage and transmit the threshold value and the compressed data to the decompression accelerator. The decompression accelerator is configured to decompress the compressed data until the threshold value is reached and then to abort further data decompression and to assert a stop transaction signal to the DMA engine.

20 Claims, 5 Drawing Sheets

RANDOM ACCESS TO DECOMPRESSED BLOCKS

BACKGROUND

Electronic data storage needs are growing, thereby calling upon further investments in electronic storages and hence increased costs. One approach to cutting data storage costs is to compress data prior to storage so that more data can be stored in less storage space. For example, if 100 MB of uncompressed data is compressed to 10 MB of compressed data, the amount of data storage needed is significantly reduced, thereby reducing costs. To read the compressed data, the data must first be decompressed.

Some kinds of data are highly structured, such as databases. To read a particular record from within a database that is stored in compressed form, the system may decompress the entire database or an entire block of the database to access the particular record in decompressed form.

BRIEF DESCRIPTION OF THE DRAWINGS

For a detailed description of various examples, reference will now be made to the accompanying drawings in which.

DETAILED DESCRIPTION

Various embodiments of apparatus and methods are described herein that provide efficient access to storage in some computer systems. In an effort to conserve storage resources, data may be compressed and stored in compressed form in a storage device (e.g., hard disk drive, solid-state storage drive, etc.). While storing data in compressed form reduces the need for higher capacity storage systems, the random access of data within a structured compressed data set is problematic. For example, a database containing 50,000 records may be compressed and stored in compressed form. Because the database is compressed, retrieval of an individual record within the compressed database generally requires the decompression of the entire database.

The disclosed embodiments are directed to a direct memory access (DMA) engine in combination with a compression/decompression accelerator (also termed a compression/decompression engine) to obtain a selected portion of decompressed data from a block of compressed data. In response to a read request from a central processing unit (CPU), the DMA engine reads compressed data from storage and provides the stream of compressed data to the compression/decompression accelerator for decompression of the data. The DMA engine also may provide a threshold value, supplied to it by the CPU, to the compression/decompression accelerator to indicate where data of interest is located relative to the decompressed block of data. When the compression/decompression accelerator decompresses the block of data from its initial data values (e.g., bytes) to the indicated threshold in the decompressed data, the compression/decompression accelerator may stop further processing of compressed data and may send a transaction stop signal to the DMA engine. In an embodiment, the DMA engine may further send a transaction identity, such as a transaction number, to the compression/decompression accelerator on initiation of a data decompression transaction. In this case, the compression/decompression accelerator sends the transaction identity with the transaction stop signal to the DMA engine.

When the DMA engine receives the transaction stop signal the DMA engine may cease reading additional compressed data, thereby conserving the processing time and power the DMA engine otherwise would have consumed in reading the remainder of the compressed data block. Also, by stopping the reading of additional compressed data, bandwidth on the data bus (e.g., DRAM/PCIe bandwidth) that the DMA engine would otherwise consume may be saved. The conserved processing time may be used to perform other storage access processing, thereby reducing the latency and increasing the throughput of the storage system that may include the DMA engine.

Figure 1:
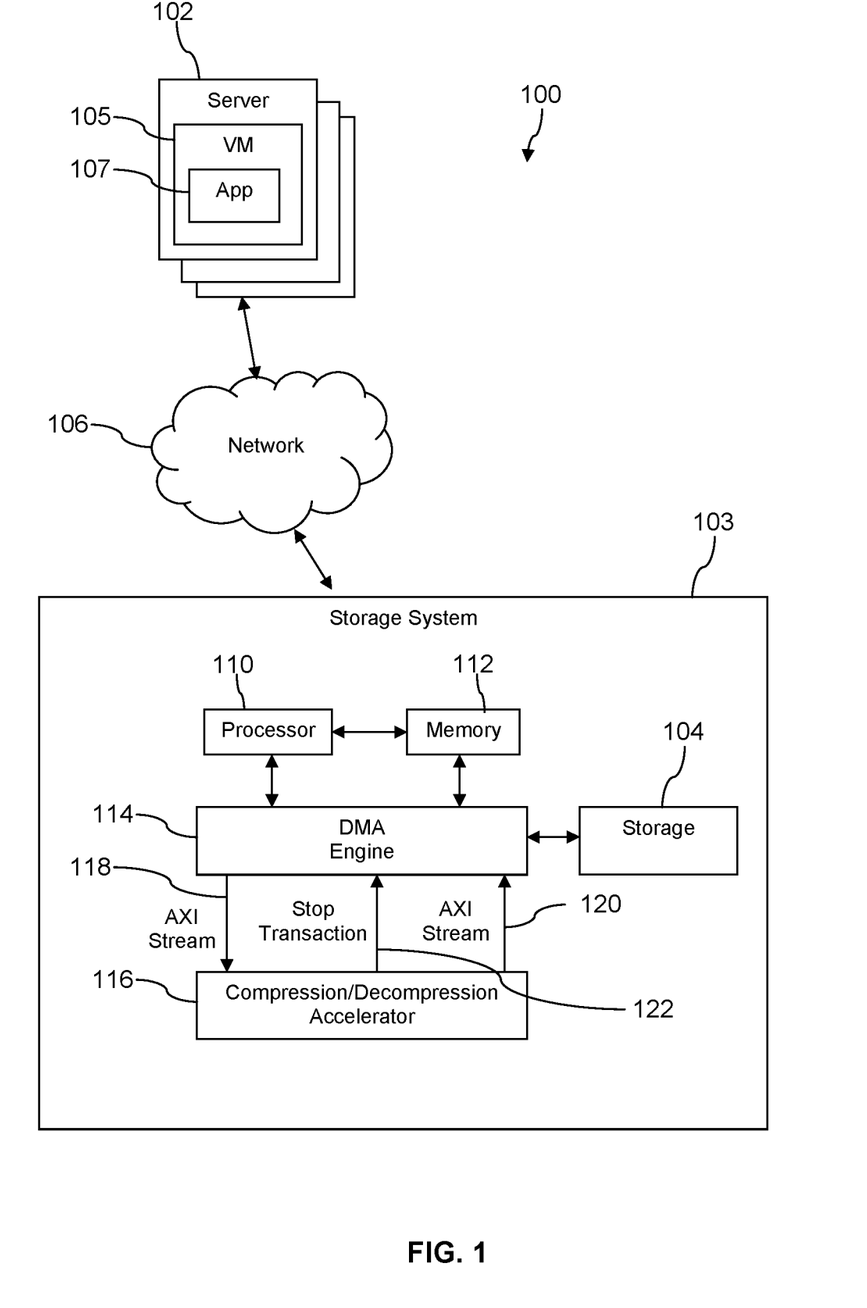
FIG. 1 shows a system in accordance with various examples.

FIG. 1 shows an example of a system 100 comprising an application 107 executing in a virtual machine (VM) 105 on a server computer 102 that writes to and reads from a storage system 103 via a network 106. In an embodiment, the system 100 may be a computing environment supported by a computing service provider. In some embodiments, the computing environment of system 100 comprises a provider network to which one or more customers are subscribers. The customers of the provider network can access the provider network to request the creation of one or more virtual machines to execute whatever applications 107 the customer so chooses. It is understood that the system 100 may comprise any number of severs 102, each server 102 can execute one or more virtual machines on behalf of different customers, and each virtual machine may be used to execute one or more applications 107. The network 106 may be a private network comprising switches, routers, etc., within the provider network to communicatively couple together the servers 102, the storage system 103, and any other devices and systems of the provider network.

The storage system 103 includes or otherwise has access to storage 104. The storage 104 may comprise non-volatile storage such as magnetic storage (e.g., hard disk drives), solid-state storage drives, or other types of mass storage devices. Storage 104 may comprise a single storage device or multiple storage devices. In addition to storage 104, the storage system 103 comprises a processor 110, memory 112, a DMA engine 114, and a compression/decompression accelerator 116. The access to the storage 104 is mediated by the processor 110. The processor 110 may receive requests from, for example, application 107 to read and write data from and to the storage 104. The processor 110 may delegate writing of data to and reading of data from the storage 104 to the direct memory access (DMA) engine 114. In an embodiment, the storage system 103 may be implemented as one or more server computers, where each server may comprise one or more processor 110, one or more memories 112, one or more DMA engines 114, and one or more compression/decompression accelerators 116.

For example, the processor 110 may receive from the application 107 a write request with uncompressed data to be written to storage 104. The processor 110 may store the uncompressed data received from the application 107 in the memory 112, or the data from the application 107 may be stored in memory 112 by way of a separate interface that does not include the processor 110. The memory 112 of the storage system 103 may be used as a temporary buffer in which pending read and write requests from various customer applications 107 may be stored pending execution by the processor 110 with respect to storage 104.

Based on the read and/or write requests, the processor 110 generates a manifest or description defining the data transaction to be performed by the DMA engine 114. The manifest may comprise a plurality of source descriptors that identify locations or buffers in the memory 112 for the DMA engine 114 to read uncompressed data from and a plurality of destination descriptors that identify locations in the storage 104 for the DMA engine 114 to write compressed data to. Each descriptor defines a contiguous span of memory 112 or storage 104.

For a write transaction in which uncompressed data from memory 112 is to be compressed and written to storage in compressed form, the DMA engine 114 reads the manifest, reads the uncompressed data beginning at the locations or buffers in the memory 112 identified by the source descriptors of the manifest, and sends the uncompressed data to the compression/decompression accelerator 116 to be compressed. The compression/decompression accelerator 116 compresses the data provided by the DMA engine 114 and sends the compressed data back to the DMA engine. The DMA engine 114 writes the compressed data into the storage 104 starting at locations or buffers defined by the destination descriptors. The DMA engine 114 may signal to the processor 110 that the requested write operation has completed, and the processor 110 may signal to the application 107 that the requested write has been completed.

As another example, the processor 110 may receive a read request from the application 107. Based on the read request from the application, the processor 110 generates a manifest comprising a plurality of source descriptors that identify locations or buffers in the storage 104 from which the DMA engine 114 is to read compressed data and a plurality of destination descriptors that identify locations or buffers in the memory 112 to which the DMA engine 114 is to write decompressed data pending its return to the application 107. The DMA engine 114 reads the manifest, reads the compressed data starting at the locations or buffers in the storage 104 identified by the source descriptors, and sends the compressed data to the compression/decompression accelerator 116. The compression/decompression accelerator 116 decompresses the compressed data and returns decompressed data to the DMA engine 114. The DMA engine 114 writes the decompressed data into locations or buffers in the memory 112 identified by the destination descriptors. The processor 110 may then read the decompressed data from the memory 112 and transmit the decompressed data to the application 107, thereby completing the read request.

During a write operation, the DMA engine 114 may stream the uncompressed data via, for example, a first Advanced eXtensible Interface (AXI) stream 118 to the compression/decompression accelerator 122. The compression/decompression accelerator 116 may compress the data according to a compression algorithm that may be defined or selected by the DMA engine 114 and may stream the compressed data back to the DMA engine 114 via a second AXI stream 120. AXI and AXI stream are specifications defined by the advanced microcontroller bus architecture (AMBA), an open-standard, on-chip interconnect specification for the connection and management of functional blocks in system-on-a-chip (SoC) designs.

Figure 4:
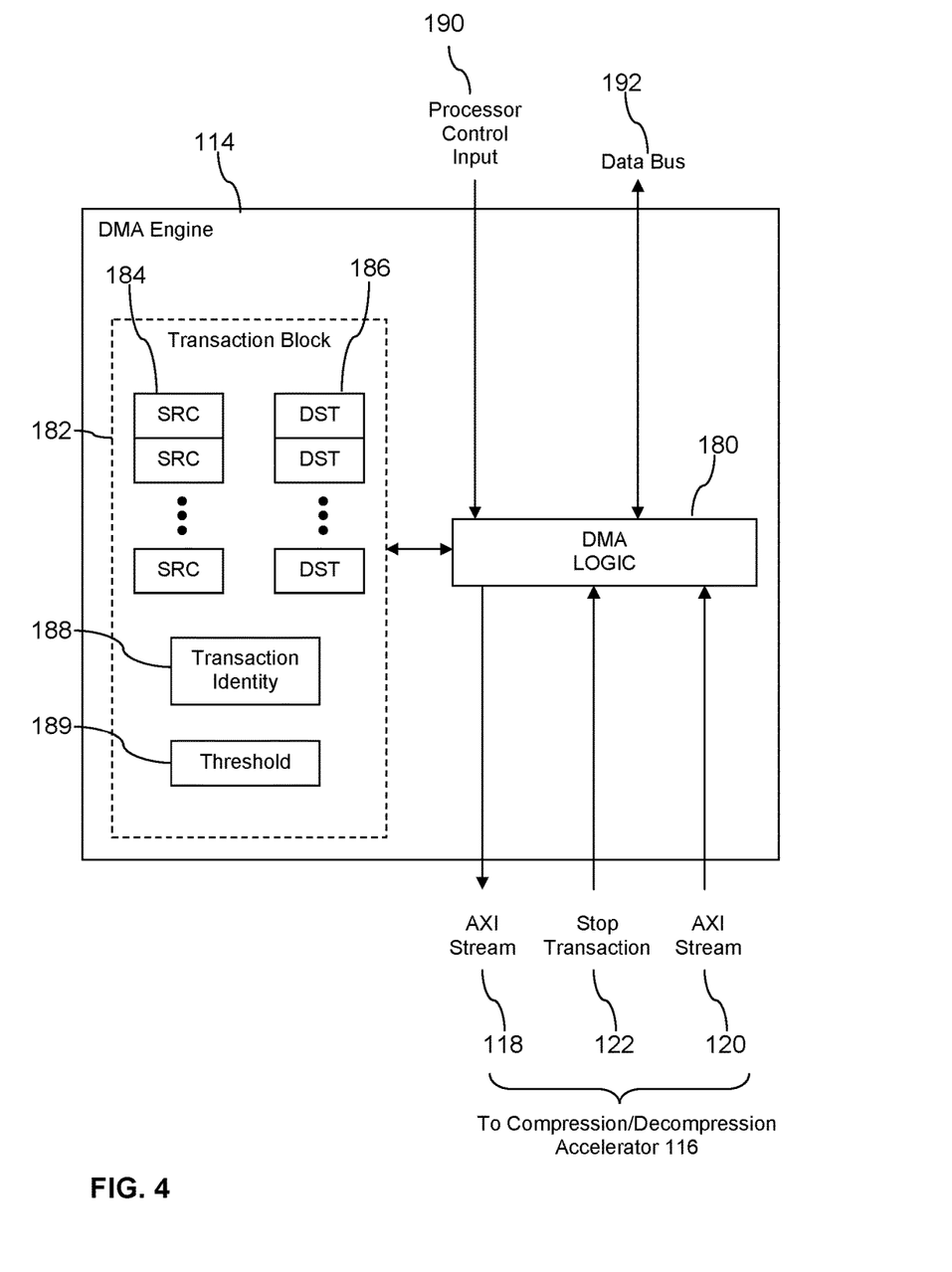
FIG. 4 shows a direct memory access (DMA) engine in accordance with various examples.
Figure 5:
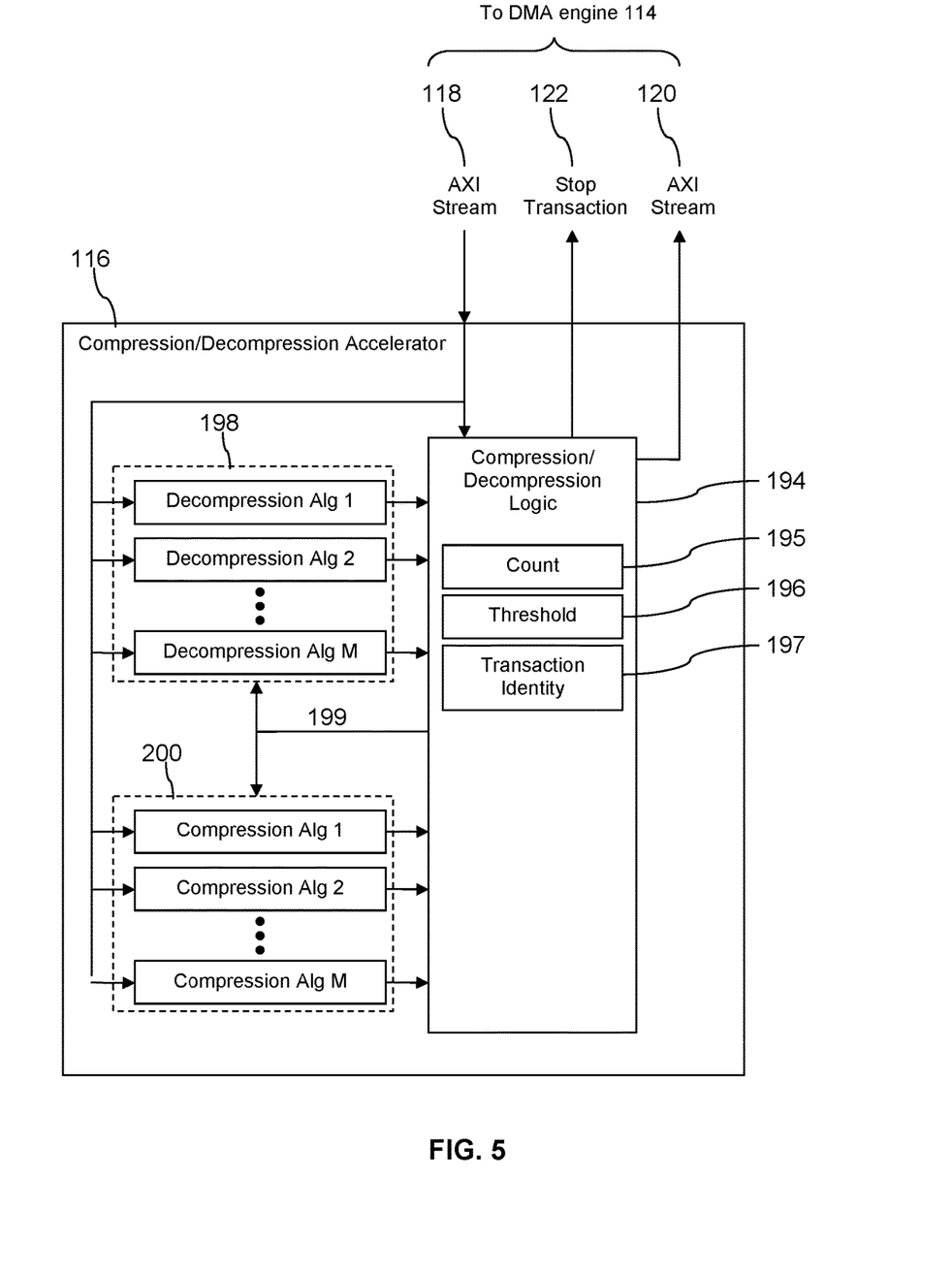
FIG. 5 shows a compression/decompression accelerator in accordance with various examples.

During a read operation, the DMA engine 114 may stream the compressed data via the first AXI stream 118 to the compression/decompression accelerator 122. The compression/decompression accelerator 116 may decompress the data according to a decompression algorithm that may be defined or selected by the DMA engine 114 and streams the decompressed data back to the DMA engine 114 via the second AXI stream 120. While AXI stream interfaces are illustrated in FIG. 1, FIG. 4, and FIG. 5 and discussed in this specification, other interfaces and/or other interface standards may be used as well for communicating compressed, uncompressed, and decompressed data between the DMA engine 114 and the compression/decompression accelerator 116.

When the processor 110 defines a span of compressed data to be read from the storage 104 by the DMA engine 114, it may be in response to a request from the application 107 to read a specific location or sub-span portion of that span of compressed data. For example, the application 107 may submit a request to read a $13,000^{th}$ record in a specific file (e.g., record 13,000 in a database containing 50,000 records). The processor 110 may map this file to a portion of storage 104 that extends from the $1^{st}$ entry in the specific file to the $13,000^{th}$ record in the specific file. The processor 110 may provide descriptors describing the entire extents of the corresponding compressed data of the file in the storage 104 because it does not know specifically where in the compressed data the subject $13,000^{th}$ record may be located, because compression algorithms may be non-linear. The processor 110 may provide this location of the desired data relative to the location in the decompressed file, data base, or blob in the form of the threshold to the DMA engine 114 with the read request and descriptors. Alternatively, the processor 110 may provide the location or threshold in a separate control word or in a metadata descriptor. Alternatively, the processor 110 may provide the location or threshold to the DMA engine 114 by writing into a register (not shown) of the DMA engine 114.

In an embodiment, when the DMA engine 114 receives a request from the processor 110 to read compressed data from the storage 104 (i.e., receives a read manifest and/or descriptors identifying the read operation and the location or locations in storage 104 to read from), the DMA engine 114 associates the read request with a storage transaction, creates a transaction identifier for the storage transaction, and sends the transaction identifier to the compression/decompression accelerator 116. The transaction identifier may be an integer that the DMA engine 114 generates in a sequence starting from an initial value (e.g., 0) and incrementing upon each read request to be processed (e.g., 0, 1, 2, 3, etc.). The transaction identifier may reset once a terminal value is reached. In an embodiment, the DMA engine 114 may receive the transaction identifier from the processor 110 rather than itself creating the transaction identifier.

The DMA engine 114 may transmit the transaction identity in the first AXI stream 118 or via a different interface to the compression/decompression accelerator 116. The DMA engine 114 further may transmit a threshold value or location in the decompressed data. This threshold value may identify a specific location of interest in the decompressed data or may indicate the end of the stream of decompressed data that is of interest or desired by the processor 110. This threshold value may mark a single record that is desired by the application 107, such as record in a database. This threshold value may mark the end of a series of entries or the last block of data that is desired by the application 107. The DMA engine 114 may also transmit a command indicating that a decompression operation is desired. The command may further identify which of a plurality of decompression algorithms are to be employed to decompress a compressed data stream. Alternatively, the DMA engine 114 may simply send an identity of a decompression algorithm to be employed which inherently denotes that a decompression operation is commanded.

In an embodiment, the DMA engine 114 and the compression/decompression accelerator 116 may be implemented on a single substrate (e.g., packaged as a single semiconductor chip). In another embodiment, however, the DMA engine 114 and the compression/decompression accelerator 116 may be implemented on different substrates and provided as two different semiconductor chips. The compression/decompression accelerator 116 may be implemented as a single dual-function component that both compresses and decompresses data in accordance with one or more compression and decompression algorithms as specified by the DMA engine 114. Alternatively, the compression/decompression accelerator 116 may be implemented with two separate single-function components: a first component or block that performs compression and a second component or block that performs decompression. Because the accelerator 116 may perform either or both of data compression and decompression, by way of shorthand, the accelerator may be referred to herein as a compression accelerator or as a decompression accelerator.

In an embodiment, when the compression/decompression accelerator 116 (or, in other words, the decompression accelerator) decompresses a stream of compressed data up to the threshold defined by the DMA engine 114, it stops further processing of the compressed data received on the first AXI stream 118 and sends a stop transaction signal 122 to the DMA engine 114. The stop transaction signal 122 may be a dedicated signal or control line or the stop transaction signal 122 may be a message sent on another communication channel between the compression/decompression accelerator 116. The compression/decompression accelerator 116 (the decompression accelerator) may further transmit the transaction identity of the subject transaction on the stop transaction signal 122 to the DMA engine 114. In response to the receipt of the stop transaction signal 122 from the compression/decompression accelerator 116 (from the decompression accelerator), the DMA engine 114 discontinues further reading of compressed data from the storage 104. The DMA engine 114 may initiate a next storage transaction.

Figure 2:
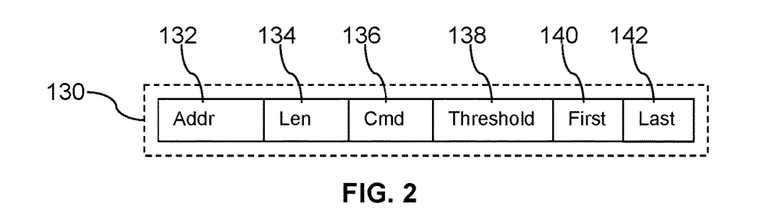
FIG. 2 shows a descriptor data structure in accordance with various examples.

Turning now to FIG. 2, an illustrative descriptor 130 is shown. The descriptor 130 may comprise an address field 132, a length field 134, a command identity or command name field 136, a threshold value or location identity field 138, a first bit field 140 and a last bit field 142. Descriptors 130 may have fewer or more fields than that shown in FIG. 2 depending on implementation use. For example, descriptors 130 to be used to designate sources of data for a decompression operation may comprise the threshold field 138 while descriptors 130 to be used to designate sources of data for a compression operation may not comprise the threshold field 138. The address field 132 may identify a starting address of a block of memory and the length field 134 may identify how large the block of memory is, for example a byte count. A single descriptor 130 designates a contiguous extent of memory. The starting address and length fields thus specify that the memory transaction is to begin, for example, reading a contiguous block of data whose length is specified in the length field and the initial data value is located at the starting address. The command field 136 may identify whether a read operation or a write operation is to be performed on the storage 104. The command field 136 may further indicate whether the data is to be compressed or decompressed and further may indicate which of a plurality of compression or decompression algorithms are to be employed in the read or write operation.

A single read or write access transaction may include a plurality of descriptors 130, particularly if the data to be read or written is not a single contiguous block of data or is a size that exceeds the maximum size defined by the length field 134. For example, a plurality of descriptors 130 may be used because a descriptor may be restricted to identifying a maximum extent of storage 104, for example a maximum of 1 MB block of storage 104, and more than the maximum extent of storage that may be identified by a single descriptor are the object of the subject storage transaction (e.g., read 5 MBs of contiguous memory). Alternatively or additionally, a plurality of descriptors 130 may be used because the region of storage 104 that is the object of the storage transaction is disposed in non-contiguous blocks. Descriptors 130 that are associated with a single storage transaction may be designated by use of the first bit field 140 and the last bit field 142. When a descriptor 130 is the first descriptor in a storage transaction, the first bit field 140 may be set to '1' and the last bit field 142 may be set to '0.' When a descriptor 130 is the last descriptor in a storage transaction, the first bit field 140 may be set to '0' and the last bit field is set to '1.' When a descriptor 130 is neither the first nor the last descriptor in a storage transaction, both the first bit field 140 and the last bit field may be set to '0.'

Figure 3A:
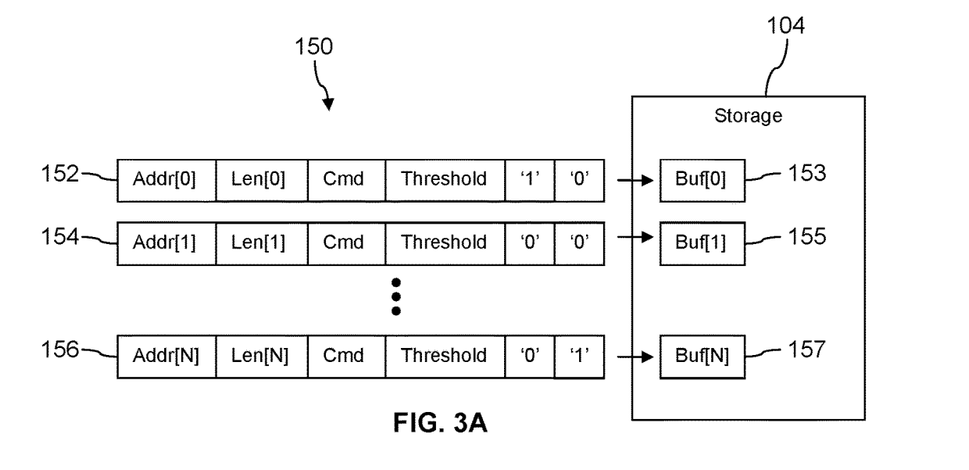
FIG. 3A shows a plurality of exemplary source descriptors associated with a data storage read transaction in accordance with various examples.

Turning now to FIG. 3A a plurality of source descriptors 150 associated with a data read transaction comprise a first source descriptor 152, a second source descriptor 154, and a third source descriptor 156 for a data read transaction are described (e.g., a read of compressed data from storage 104, decompression of the data, and writing the decompressed data to the memory 112). The first source descriptor 152, being the first source descriptor of a storage transaction, has its first bit field set to '1' and its last bit field set to '0.' If the storage transaction comprises only a single source descriptor, both the first bit field and the last bit field may be set to '1.' The second source descriptor 154, being neither the first nor the last source descriptor in the subject storage transaction, has both its first bit field and its last bit field set to '0.' There may be additional descriptors between the second and third source descriptors 154 and 156. The third source descriptor 156, being the last source descriptor in the subject storage transaction, has its first bit field set to '0' and its last bit field set to '1.' The first source descriptor 152 identifies a first buffer 153 in storage 104, the second source descriptor 154 identifies a second buffer 155 in storage 104, and the third source descriptor 156 identifies a third buffer 157 in storage 104. The locations in storage 104 identified by the source descriptors 152-156 represent the compressed data to be retrieved from storage 104 for decompression and subsequent storage in memory 112. In an embodiment, only one source descriptor such as the first source descriptor in a plurality of source descriptors associated with a same transaction may comprise the threshold field 138 while other source descriptors associated with the same transaction may omit the threshold field 138.

Figure 3B:
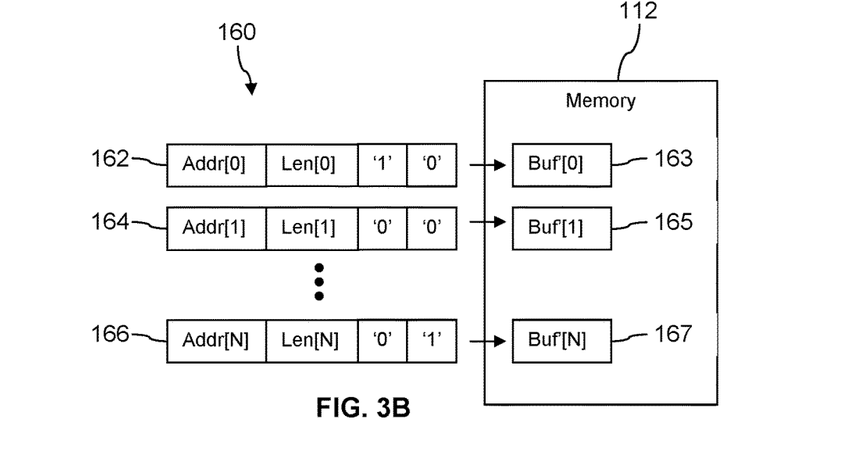
FIG. 3B shows a plurality of exemplary destination descriptors associated with a data storage read transaction in accordance with various examples.

FIG. 3B illustrates a plurality of destination descriptors associated with the read data transaction. The destination descriptors in this example include a first destination descriptor 162, a second destination descriptor 164, and a third destination descriptor 166. The destination descriptors 162, 164, 166 need not specify the length or the command so these fields may be omitted from the destination descriptors. The first destination descriptor 162, being the first destination descriptor of a storage transaction, has its first bit field set to '1' and its last bit field set to '0.' If the storage transaction comprises only a single destination descriptor, both the first bit field and the last bit field may be set to '1.' The second destination descriptor 164, being neither the first nor the last destination descriptor in the subject storage transaction, may have both of its first bit field and last bit field set to '0.' The third destination descriptor 166, being the last destination descriptor in the subject storage transaction, may have its first bit field set to '0' and its last bit field set to '1.' The first destination descriptor 162 identifies a first buffer' 163 in memory 112, the second destination descriptor 164 identifies a second buffer' 165 in memory 112, and the third destination descriptor 166 identifies a third buffer' 167 in memory 112 into which the decompressed data is to be written pending the data's return to the application 107 that requested the data.

The DMA engine 114 reads compressed data from storage 104 at locations designated by source descriptors 152, 154, 156. The DMA engine 114 streams the compressed data read from storage 104 to the compression/decompression accelerator 116. The compression/decompression accelerator 116 decompresses the received compressed data and streams the decompressed data back to the DMA engine 114. The DMA engine writes the received decompressed data into the memory 112 at locations designated by the destination descriptors 162, 164, 166.

FIG. 4 illustrates an embodiment of the DMA engine 114. The DMA engine 114 may comprise a DMA logic block 180. In some contexts, the DMA logic block 180 may be referred to as a controller component. The DMA engine 114 further may comprise one or more transaction blocks 182. The transaction block 182 may be a hardware component or an area in local memory of the DMA engine 114, for example a block of local memory that is dynamically allocated by the DMA logic block 180 to perform a transaction on the data storage 104. The transaction block 182 may store information about a storage transaction, for example a plurality of source descriptors 184, a plurality of destination descriptors 186, a transaction identity 188, and a threshold 189. The transaction block also may be referred to as a control buffer. In a data write transaction (i.e., uncompressed data transmitted from the application 107 to be compressed and written to the storage 104) the transaction block 182 may not employ or comprise a transaction identity 188 or a threshold 189.

The DMA logic block 180 may receive control inputs from the processor 110 via control input 190, for example a storage transaction command, source descriptors 184, destination descriptors 186, and possibly other control parameters such as a threshold or location value and/or an identification of a compression algorithm or a decompression algorithm to be used in the storage transaction. In some embodiments, the DMA engine 114 couples to the memory 112 and the storage 114 via a single data bus 192 and thus reads uncompressed data from and writes decompressed data to the memory 112 on data bus 192 as well as writes compressed data to and reads compressed data from the data storage 104 on the same data bus 192. In other embodiments, the DMA engine 114 couples to the memory 112 and to the storage 104 via separate buses. That is, data bus 192 may represent a single bus or multiple buses. In some contexts the data bus 192 may be referred to as a data interface of the DMA engine 114. The DMA logic block 180 may create and store a transaction identity for a data storage read transaction in the transaction identity 188. The DMA logic block 180 provides read and write control in response to commands and parameters received on the control input 190 as well as in response to the stop transaction signal 122 and the second AXI stream 120. The control input 190 may be referred to in some contexts as a control interface, and the DMA logic block 180 may be referred to in some contexts as a control circuit. The DMA logic block 180 may be implemented as one or more of combinational logic, sequential logic a state machine, a microcontroller, or another logic structure. Other architectures for the DMA engine 114 from that shown in FIG. 4 are possible as well.

Turning now to FIG. 5, an embodiment of the compression/decompression accelerator 116 is described. The compression/decompression accelerator 116 may comprise a compression/decompression logic block 194 that comprises a count register 195, a threshold register 196, and a transaction identity register 197.

The compression/decompression accelerator 116 further may comprise a plurality of decompression algorithm processing blocks 198 embodied as program instructions (e.g., firmware) and a plurality of compression algorithm processing blocks 200 also embodied as program instructions. The compression/decompression logic block 194 may perform decompression in accordance with a selected one of the processing blocks 198 and perform compression in accordance with a selected one of the compression algorithm processing blocks 200. Alternatively, the decompression algorithm processing blocks 198 and the compression algorithm processing blocks 200 may be implemented as logic components within the DMA logic block 180. Alternatively, the decompression algorithm processing blocks 198 may comprise a single decompression block that performs different decompression algorithms in response to having one or more decompression block configuration parameters set by the compression/decompression logic 194, and the compression algorithm processing blocks 200 may comprise a single compression block that performs different compression algorithms in response to having one or more compression block configuration parameters set by the compression/decompression logic 194.

The first AXI stream 118 may feed into the decompression algorithm blocks 198 and to the compression algorithm blocks 200. In an embodiment, the compression/decompression logic block 194 may selectively enable communication from the first AXI stream 118 to one of the decompression algorithm processing blocks 198 or one of the compression algorithm processing blocks 200, for example via control line 199. This may be referred to as directing the first AXI stream 118 to one of the decompression algorithm processing blocks or one of the compression algorithm processing blocks 200. In an embodiment, the compression/decompression accelerator 116 may comprise a multiplexer (not shown) that selects, under control of the compression/decompression logic block 194, which of the decompression algorithm processing blocks 198 or which of the compression algorithm processing blocks 200 the first AXI stream 118 is coupled to.

The first AXI stream 118 may configure the compression/decompression logic block 194 for compression processing of uncompressed data streams or for decompression processing of compressed data streams received on the first AXI stream 118. The configuration commands may be sent from the DMA engine 114 to the compression/decompression accelerator 116 on the first AXI stream 118 and may comprise an identification of which of the plurality of decompression algorithm processing blocks 198 or of which of the plurality of compression algorithm processing blocks 200 to activate. The configuration commands may further comprise a value to store in the threshold register 196 and a transaction identity to store in the transaction identity register 197, depending on whether the application 107 requested a write or read transaction.

When the compression/decompression accelerator 116 is configured to decompress compressed data, the compression/decompression logic block 194 increments the value stored in the count register 195 for each byte of compressed data that is decompressed by the selected decompression algorithm processing block 198 or for each unit of data of compressed data that is decompressed by the selected decompression algorithm processing block 198. The unit of data may be something other than a byte of data. For example, the unit of data may be a minimum accessible unit of data defined for the storage 104. The unit of data may be a number of bytes corresponding to a row entry in a data base table (e.g., the size of a single entry in a data base). The unit of data may be determined as some other amount of data. The compression/decompression logic block 194 streams decompressed data (or compressed data, if receiving a stream of uncompressed data to be compressed) to the DMA engine 114 via the second AXI stream 120. When the count 195 matches or exceeds the threshold 196, the compression/decompression logic block 194 commands the selected decompression algorithm processing block 198 to stop processing compressed data received from the first AXI steam 118 (or otherwise ceases data decompression) and sends a stop transaction signal 122 to the DMA engine 114 along with the transaction identity 197.

When the DMA engine 114 receives the stop transaction signal 122, it stops reading compressed data from the storage 104. In an embodiment, as the DMA engine 114 reads buffers from storage 104 as indicated by the source descriptors 150, the DMA engine marks source descriptors as "read" or "invalid" to indicate that the corresponding data has been read. When the stop transaction signal 122 is received during fulfillment of a request from the application 107 to read from storage 104, the DMA engine 114 may mark unread source descriptors as "read" or as "invalid" so that the compressed data designed by such descriptors is not read. The DMA engine may then conclude the read transaction with the processor 110, for example by asserting an end of transaction signal to the processor 110.

Figure 6:
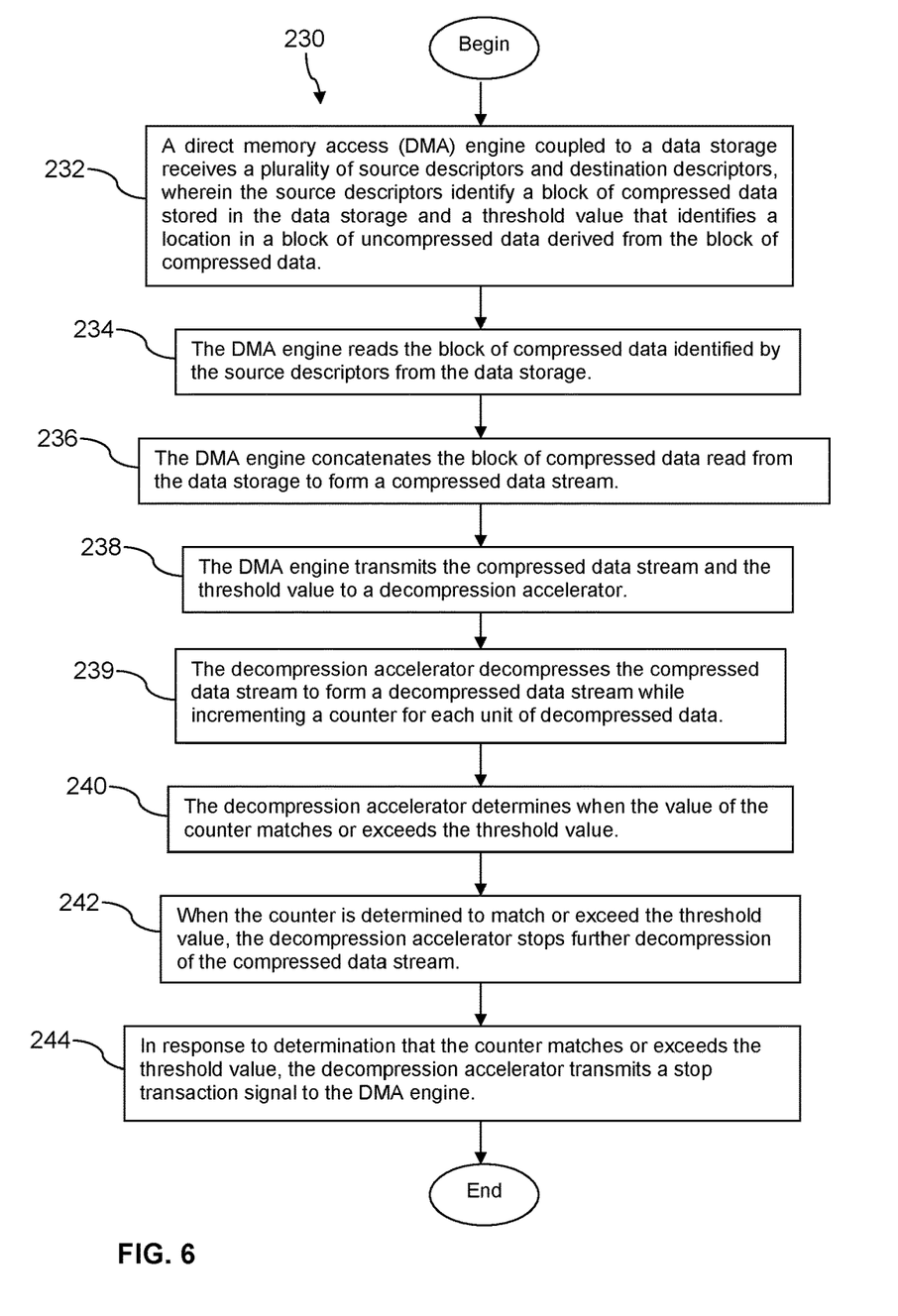
FIG. 6 shows a flow chart of a method in accordance with various examples.

Turning now to FIG. 6, a method 230 is described. In an embodiment, the method 230 may be performed by the DMA engine 114 and the compression/decompression accelerator 116 described above during fulfillment of a data read request received from the application 107. At block 232, a direct memory access (DMA) engine coupled to a data storage receives a plurality of source descriptors and destination descriptors, wherein the source descriptors identify a block of compressed data stored in the data storage and a threshold value that identifies a location in a block of decompressed data derived from the block of compressed data. The destination descriptors identify locations in memory 112 where corresponding decompressed data is to be stored. At block 234, the DMA engine reads the block of compressed data identified by the source descriptors from the data storage. At block 236, the DMA engine concatenates the block of compressed data read from the data storage to form a compressed data stream.

At block 238, the DMA engine transmits the compressed data stream and the threshold value to a decompression accelerator. The DMA engine may further determine a transaction identity associated with the data read transaction and send this transaction identity to the decompression accelerator. At block 239, the decompression accelerator decompresses the compressed data stream to form a decompressed data stream while incrementing a counter for each unit of decompressed data. At block 240, the decompression accelerator determines when the value of the counter matches or exceeds the threshold value. For example, the decompression accelerator may compare the value of the counter incremented in block 239 to the threshold value sent by the DMA engine to the decompression accelerator in block 238. At block 242, when the counter is determined to match or exceed the threshold value, the decompression accelerator stops further decompression of the compressed data stream. The decompression accelerator may ignore further compressed data streamed to it from the DMA engine for a period of time, until the DMA engine initiates a new decompression cycle, for example by sending a different threshold value and/or a different transaction identity. At block 244, in response to a determination that the counter matches or exceeds the threshold value, the decompression accelerator transmits a stop transaction signal to the DMA engine. In response to receiving the stop transaction signal from the decompression accelerator, the DMA engine may mark unprocessed source descriptors as invalid and may assert an end of transaction signal to the processor. After block 244 and in response to receiving the stop transaction signal from the decompression accelerator, the DMA engine may discard all source descriptors of the current transaction until and including a descriptor marked with a last bit having a set value (e.g., having a '1' value).

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired connection, wireless connection, or network connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of reading compressed data, comprising:
receiving a plurality of source descriptors and destination descriptors by a direct memory access (DMA) engine coupled to a data storage, wherein the source descriptors identify a block of compressed data stored in the data storage and a threshold value that identifies a location in a block of decompressed data corresponding to the block of compressed data;
reading the block of compressed data from the data storage by the DMA engine;

concatenating by the DMA engine the block of compressed data read from the data storage to form a compressed data stream;

transmitting the compressed data stream and the threshold value to a decompression accelerator by the DMA engine;

decompressing the compressed data stream to form a decompressed data stream by the decompression accelerator while incrementing a counter for each unit of decompressed data;

determining, by the decompression accelerator, when the value of the counter matches or exceeds the threshold value;

when the counter is determined to match or exceed the threshold value, stopping further decompression of the compressed data stream by the decompression accelerator; and transmitting a stop transaction signal to the DMA engine by the decompression accelerator.

2. The method of claim 1, further comprising the decompression accelerator streaming the decompressed data to the DMA engine and the DMA engine writing the decompressed data to a memory.

3. The method of claim 1, wherein the DMA engine determines a transaction identity to associate to the block of compressed data identified by the source descriptors and transmits the transaction identity to the decompression accelerator.

4. The method of claim 3, wherein the stop transaction signal transmitted by the decompression accelerator comprises the transaction identity.

5. The method of claim 1, wherein the location in the block of decompressed data designates data that is to be read out of the compressed data.

6. The method of claim 1, wherein the unit of decompressed data is one of a byte or a record of a database.

7. A direct memory access (DMA) circuit, comprising:
a data interface configured to read data from and write data to a data storage coupled to the DMA circuit and configured to read data from and write data to a memory coupled to a processor and coupled to the DMA circuit;
a control interface configured to receive a plurality of source descriptors and a plurality of destination descriptors from the processor, each source descriptor including a source location address in the data storage, each destination descriptor including a destination location address in the memory, and at least one source descriptor including a threshold value indicating a position in a stream of decompressed data;
a control buffer into which the plurality of descriptors are stored; and
a control circuit coupled to the data interface, the control interface, and the control buffer, wherein the control circuit is configured to:
transmit the threshold value to a decompression accelerator;
transmit compressed data to the decompression accelerator;
receive decompressed data from the decompression accelerator; and
upon receiving a stop transaction signal, stop reading the compressed data from the data storage.

8. The DMA circuit of claim 7, wherein the stop transaction signal is received from the decompression accelerator.

9. The DMA circuit of claim 8, wherein one of the source descriptors comprises a transaction identity associated with the plurality of source descriptors, wherein the control circuit is further configured to send the transaction identity to the decompression accelerators, and wherein the stop transaction signal comprises the transaction identity.

10. The DMA circuit of claim 8, wherein the control circuit is further configured to determine a transaction identity associated with the plurality of source descriptors and to send the transaction identity to the decompression accelerator.

11. The DMA circuit of claim 10, wherein each of the source descriptors comprises a first bit and a last bit and wherein the control circuit is further configured to determine a new transaction identity that is incremented from a previous transaction identity when a source descriptor having a first bit active is received, whereby the start of a new data storage read transaction request is indicated.

12. The DMA circuit of claim 10, wherein the stop transaction signal comprises the transaction identity.

13. The DMA circuit of claim 12, wherein the control circuit is further configured to mark source descriptors associated with the transaction identity received in the stop transaction signal as invalid.

14. The DMA circuit of claim 7, wherein the control circuit is further configured to read the compressed data from locations in the data storage identified by the plurality of source descriptors.

15. An apparatus, comprising:
a decompression accelerator comprising an electronic circuit including a counter and a decompression algorithm processing block, wherein the decompression accelerator is configured to:
receive a compressed data stream and a data count value threshold from a direct memory access (DMA) engine storing a source descriptor including the data count value threshold, the data count value threshold indicating a position in a decompressed data stream,
decompress the compressed data stream by the decompression algorithm processing block to produce the decompressed data stream,
increment a value stored in the counter for each unit of decompressed data, transmit the decompressed data stream,
determine that the value stored in the counter matches or exceeds the data count value threshold, and
stop decompressing the compressed data stream and transmit a stop transaction signal.

16. The apparatus of claim 15, further comprising a compression accelerator configured to receive an uncompressed data stream, to compress the uncompressed data stream, and to transmit the compressed data stream.

17. The apparatus of claim 15, wherein the unit of decompressed data is a record of a database.

18. The apparatus of claim 15, wherein the unit of decompressed data is a byte.

19. The apparatus of claim 15, wherein the decompression accelerator is further configured to receive a transaction identity, and wherein the stop transaction signal comprises the transaction identity.

20. The apparatus of claim 15, wherein the decompression accelerator comprises a logic block that directs the compressed data stream to the decompression algorithm processing block, reads the counter, and stops routing the compressed data stream to the decompression processing block when the value read from the counter matches or exceeds the data count value threshold.

* * * * *